April 14, 1942.  F. J. WESTROPE  2,279,542
VISOR
Filed March 28, 1941
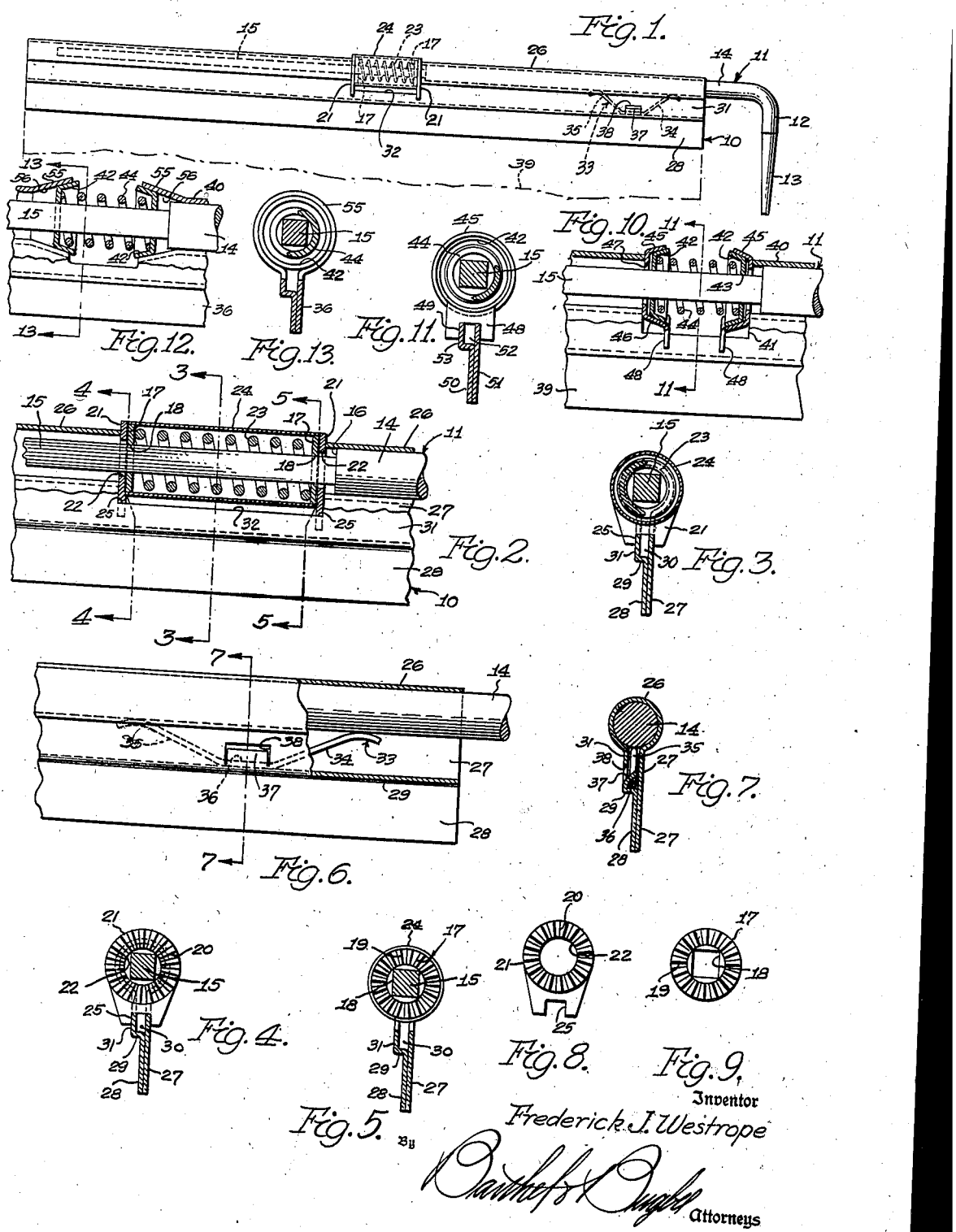
Inventor
Frederick J. Westrope
Attorneys Patented Apr. 14, 1942

2,279,542

UNITED STATES PATENT OFFICE 2,279,542

VISOR

Frederick J. Westrope, Pleasant Ridge, Mich., assignor, by mesne assignments, to Reconstruction Finance Corporation, Detroit, Mich., a corporation of the United States Application March 28, 1941, Serial No. 385,734

1 Claim. (Cl. 296—97)

This invention relates to visors or glare shields, and in particular to adjustable visors for vehicles.

One object of this invention is to provide a visor assembly having improved means for releasably holding the visor in any of a multiplicity of positions.

Another object is to provide a visor assembly which is movable about the axis of a supporting rod, means being provided between the visor and the supporting rod for firmly holding the visor in any of a multiplicity of positions around the axis of the rod, yet permitting the visor to be moved to another position upon the application of a predetermined force.

Another object is to provide a visor assembly as set forth in the preceding objects wherein the visor and rod are yieldingly interconnected by radially serrated members yieldingly hinged into engagement with each other.

Another object is to provide a visor assembly as set forth in the preceding objects wherein the visor is provided with a pair of radially serrated arms engaged by a pair of radially serrated washers mounted on the visor-supporting rod and yieldingly urged into engagement by a spring.

Another object is to provide a visor assembly having yieldable and releasable means for maintaining the visor in any desired position, together with means for preventing the rattling of the visor on its supporting rod.

In the drawing:

Figure 1 is a front elevation of a preferred embodiment of the visor assembly according to the present invention.

Figure 2 is an enlarged fragmentary longitudinal section through the releasable holder of Figure 1.

Figure 3 is a cross-section on the line 3—3 in Figure 2.

Figure 4 is a cross-section on the line 4—4 in Figure 2.

Figure 5 is a cross-section on the line 5—5 in Figure 2.

Figure 6 is a front elevation, partly broken away, of the anti-rattling spring structure in Figure 1.

Figure 7 is a cross-section on the line 7—7 in Figure 6.

Figure 8 is a front elevation of a serrated visor arm.

Figure 9 is a front elevation of a serrated washer.

Figure 10 is a view similar to Figure 2 showing a modified construction employing conical friction members.

Figure 11 is a cross section on the line 11—11 in Figure 10.

Figure 12 is a view similar to Figure 10, but showing a modification thereof.

Figure 13 is a cross-section on the line 13—13 of Figure 12.

In general, the visor assembly of this invention is provided with a round rod with a squared portion upon which two square-holed washers are slidably mounted. These washers are either radially serrated (Figures 1 to 9) or conical (Figures 10 and 11), and are urged by a coil spring in opposite directions against the similarly configured hubs of visor arms secured to the visor or glare shield panel. These visor arms are provided with enlarged center holes so as to be free from locking engagement with the squared portion of the visor-supporting rod.

By this arrangement, the visor may be releasably held in any desired position merely by tilting it around the rod to that position, whereupon the cooperating radial serrations or the frictional engagement between the conical washers and arms will firmly hold the visor in the adjusted position. The visor may also be easily moved along the rod to any desired position, whereupon it is held in that position by a leaf spring. The latter also serves as an anti-rattling spring for additionally assisting in preventing the rattling of the visor upon its supporting rod as the vehicle vibrates or is jolted.

Referring to the drawing in detail, Figure 1 shows the visor assembly of this invention as consisting of a visor generally designated 10 mounted upon a visor-supporting rod generally designated 11. The latter is provided with a bent end portion 12 having a tapered end 13 suitable for connection to a bracket (not shown) which is mounted upon any suitable portion of the vehicle body, as is well understood by those skilled in the art.

The visor-supporting rod 11 is provided with a portion 14 of circular cross-section terminating in a reduced diameter portion 15 of square cross-section, separated therefrom by the annular shoulder 16 (Figure 2). Mounted upon the squared rod portion 15 are two spaced washers 17 having squared holes 18 (Figure 5) loosely and slidably fitting the squared shaft 15 so as to permit longitudinal motion but prohibit rotary motion. The washers 17 on their outer surfaces are provided with radial serrations or ridges 19 which cooperate with similar radial serrations 20 upon the visor arms 21 (Figures 2 and 4). The visor arms 21 are provided with circular holes 22 larger than the squared rod portion 15, thereby permitting the visor arms 20 to be rotated around the squared rod portion 15. A coil spring 23 encircles the squared rod portion and yieldingly urges the serrated washers 17 into locking engagement with the serrated visor arms 21 (Figure 2). A tubular casing 24 in turn surrounds the spring 23 and protects it from dust, as well as concealing it from view.

The visor-supporting arms 21 are provided with rectangular notches 25. The visor 10 is provided with a tubular supporting member 26 encircling the rod 14 and having its opposite edges 27 and 28 bent together (Figures 4 and 5). Immediately prior to the junction of the portions 27 and 28, the portion 28 is provided with an outwardly bent portion 29 spaced apart from the portion 27 and forming a chamber 30 extending lengthwise of the visor. The bent portion 29 proceeds upwardly in a portion 31 parallel to the portion 27, and is secured in the notches 25 in the spaced visor supporting arms 21. The tubular support 26 in the vicinity of the arms 21 is provided with a longitudinally cutaway portion 32 (Figure 2), providing a clearance for the spring casing 24 and its associated parts.

Adjacent one end of the tubular visor support 26 is a two-armed anti-rattling spring 33 mounted in the chamber 30 between the portions 27 and 31. The anti-rattling spring 33 has opposite end portions 34 and 35 (Figure 6) bending upwardly against the rod portion 14 and having a central portion 36 which is firmly secured to the tubular visor support 26 by the tab 37 cut out of the slot 38 in the portion 31 and bent around the spring portion 36 into engagement with the inner wall of the portion 27 (Figure 7).

The glare shield portion 39 which protects the eyes by intercepting the light, is secured to the opposite portions 27 and 28 of the tubular visor support 26 in any suitable way, such as by inserting it between the portions 27 and 28, securing it directly to the portion 28 or to a U-shaped rod extending from one end to the other of the tubular visor support 26. The particular manner of securing the visor portion 39 to the support 26 is conventional.

In operation, it is assumed that the visor-supporting rod 11 is mounted upon the vehicle with its tapered portion 13 in a suitable socket or bracket in the vicinity of the windshield. When the driver of the vehicle encounters a glaring light such as from the rising or setting sun or from the headlights of an approaching vehicle, he grasps the glareshield portion 39 and pulls it downwardly so as to tilt the visor around its supporting rod 11. As the visor is rotated around its rod, the radial serrations 20 upon the arms 21 slip in and out of the corresponding serrations on the washers 17, the two sets of serrations operating like interengaging teeth. As the serrations move over one another, the coil spring 23 yields to permit this.

When the operator has adjusted the visor to suit his convenience, he releases it, whereupon the coil spring 23 pushes the serrations 19 of the washers 17 firmly into the corresponding notches between the serrations 20 of the visor-supporting arms 21. The visor is then held firmly in its adjusted position and will not jar out of this position with any ordinary vibration or jolting.

After the source of glare has been removed or the glare has ceased, the operator grasps the visor portion 39 and moves the visor out of line of vision, preferably up toward the top of the vehicle. When this occurs, the spring 23 again yields as the serrations of the arms 21 slip over the corresponding serrations in the washers 17. Meanwhile, the arms 34 of the anti-rattling spring construction (Figure 6) employing the double-armed spring 33 forms no part of the present invention and is described and claimed in my co-pending application Serial No. 342,111, filed June 24, 1940.

In the modification shown in Figures 10 and 11, the tubular visor support 40 is provided with a cutaway portion 41 forming a gap through which the square portion 15 of the rod 11 projects. The rod 11 is similar in construction to that shown in Figure 1. Mounted on the squared portion 15 of the rod 11 are two outwardly-facing frusto-conical washers 42 having square holes 43 similar to the square holes 18 of the serrated washers 17 of the principal form of the invention. The conical washers 42 are urged in opposite directions by a coil spring 44 into engagement with the concave conical portions 45 of the visor-supporting arms 46 and have enlarged central holes 47 so as to permit free rotation around the squared shaft portion 15. The ends 48 of the visor-supporting arms 46 are notched as at 49 in a manner similar to the notch 25 in the visor-supporting arms 21 of the principal form of the invention and the edge portions 50 and 51 of the tubular visor support 40 are similarly engaged by the notch portions 49 (Figure 11). A chamber 52 is likewise provided between the offset portion 53 of the edge portion 50 and the edge portion 51.

The operation of the modification of Figures 10 and 11 is generally similar to the principal form of Figures 1 to 9 inclusive except that the frusto-conical washers 42 frictionally engage the concave conical portions 45, hence, the visor panel 39 may be held in any adjusted position and is not dependent upon the intermeshing of serrations. The frictional engagement of the conical members 42 and 45 also eliminates the clicking sound which occurs when the principal form of the invention is adjusted by tilting it around the rod 11. If it is desired to move the glare shield or visor panel 39 longitudinally along the rod 11, this is done by merely pushing it in one direction or the other, as in the principal form of the invention, the double-armed leaf spring 33 exerting a frictional effect which holds the visor in its adjusted position longitudinally along the rod 11 and at the same time prevents rattling.

The modification shown in Figures 12 and 13 is similar to that shown in Figures 10 and 11 as regards the construction of the supporting rod 11 with its squared portion 15, conical washers 42 with their square holes 43, and coil spring 44 urging these apart. Instead of the separate visor-supporting arms 46, the tubular visor support 40 is flared as at 55 to provide internal conical surfaces 56 for frictional engagement by the conical washers 42. The remainder of the structure is similar to that shown in Figures 10 and 11 and is designated with similar reference numerals.

While a specific embodiment of the invention has been described and illustrated, it will be understood that various modifications may be made within the scope of the appended claim without departing from the spirit of the invention.

What I claim is:

In a visor assembly, a supporting rod having a rotation-preventing portion therealong, a pair of elements non-rotatably but slidably mounted on said rod portion, yielding means for urging said elements in opposite directions, a second pair of elements mating respectively with the first pair, one pair of elements being concave and the other pair being convex, and a visor secured to one pair of said elements.

FREDERICK J. WESTROPE.